United States Patent [19]
Killinger et al.

[11] Patent Number: 5,301,962
[45] Date of Patent: Apr. 12, 1994

[54] TOOL HOLDER

[75] Inventors: Bernd Killinger, Freiberg; Gerhard Scheer, Loechgau, both of Fed. Rep. of Germany

[73] Assignee: Komet Praezisionswerkzeuge Robert Breuning GmbH, Besigheim, Fed. Rep. of Germany

[21] Appl. No.: 58,908

[22] Filed: May 5, 1993

[30] Foreign Application Priority Data

May 6, 1992 [DE] Fed. Rep. of Germany ....... 4214479

[51] Int. Cl.⁵ .............................................. B23B 31/02
[52] U.S. Cl. .................................. 279/105.1; 279/156
[58] Field of Search ............................. 279/105.1, 156

[56] References Cited
U.S. PATENT DOCUMENTS

| | | | |
|---|---|---|---|
| 3,677,560 | 7/1972 | Clarkson | 279/105.1 X |
| 3,909,062 | 9/1975 | Benatti | 279/51 X |
| 4,668,138 | 5/1987 | Carter | 279/156 X |
| 5,032,043 | 7/1991 | Hollifield | 279/48 X |
| 5,137,289 | 8/1992 | Butikofer | 279/156 |

FOREIGN PATENT DOCUMENTS

| | | | |
|---|---|---|---|
| 1955512 | 5/1971 | Fed. Rep. of Germany | ... 279/105.1 |
| 191507 | 9/1988 | Japan | ................... 279/105.1 |
| WO90/10517 | 9/1990 | World Int. Prop. O. . | |

*Primary Examiner*—Steven C. Bishop
*Attorney, Agent, or Firm*—Flynn, Thiel, Boutell & Tanis

[57] ABSTRACT

A tool holder includes a base member (10), a shaft (12) arranged on the rearward end of the base member (10) for connection to a machine spindle and a front facing recess in the front end of the base member arranged coaxially with respect to the shaft axis for receiving therein a coaxially aligned tool (24) which can be clamped in place by means of a clamping member (22). A regulating member (28) is furthermore axially guided in the base member (10), which regulating member serves as a positioning stop for the tool (24). In order to make possible a simple adjustment of the regulating member from a location externally of the tool holder, the regulating member (28) is constructed so that it has an axially extending rack thereon, while a gear (32) mating with the tooth system (30) of the rack and a clamping screw (42) engaging a keyway (38) of the regulating member (28) with its cone tip (44) are supported in the base member (10).

14 Claims, 2 Drawing Sheets

TOOL HOLDER

FIELD OF THE INVENTION

The invention relates to a tool holder comprising a base member, a shaft arranged at the rearward end of the base member for connection to a machine spindle or a spindle adapter, a recess arranged coaxially with respect to the axis of the shaft at the front end of the base member for receiving therein a coaxially aligned tool which can be clamped into position by means of a clamping member preferably constructed as a chuck or collet, and a regulating member axially movable in the base member and engaged by a clamping element accessible from a side of the shaft into a recess, to form a positioning stop for the tool, with the regulating member being constructed so that it has an axially extending rack thereon, and a gear mating with the tooth system of the rack and a clamping element movable into and out of engagement with the rack supported in the base member.

BACKGROUND OF THE INVENTION

Tool holders of this type are particularly suited for receiving shaving tools having a cylindrical shaft, such as drills, cutters and reaming tools. The recess is thereby usually designed as a chuck or as a collet receiving means. The regulating member which coaxially extends into the recess can be adjusted in a predetermined range to serve as a positioning stop for the axial adjustment of the tool. An adjusting screw is usually used as the regulating member, which adjusting screw can be operated only through the shaft or through an externally accessible recess. To adjust the regulating member, thus either the tool holder must be removed from the spindle or the tool from the tool holder.

It is furthermore known in a tool holder of the above-mentioned type (WO 90/10517) to adjust the regulating member with an adjusting mechanism operable from the outer surface of the base member. The regulating member is supported in the base member and is there constructed so that it has an axially extending cylindrical bolt with a rack section thereon, and a gear mates with the tooth system of the rack section and a clamping element is movable into and out of engagement with the outer surface of the cylindrical bolt. Since the positioning stop is exposed to significant axial forces during the machining operation, there exists the danger that an unwanted axial adjustment occurs when the clamping member provided there is not sufficiently tightened.

SUMMARY OF THE INVENTION

Starting out from this, the basic purpose of the invention is to provide a tool holder of the above-disclosed type, the regulating member of which can be adjusted through an extensive adjusting path by a linear transfer of a rotary movement into a longitudinal adjusting path from a location external of the base member and can be reliably fixed on the base member.

To attain this purpose, the invention suggests that the regulating member has an axially extending keyway for receiving a clamping element provided with a corresponding key or cone tip thereon, and that the regulating member, under the action of the clamping element, press its key or cone tip against the key flanks to effect an expanding of the regulating member at least locally against the base member. The clamping element is for this purpose constructed advantageously as a clamping screw which can be adjusted in a direction perpendicularly with respect to the rack in the base member so that its cone tip extends into the keyway in the rack.

A key clamp operable from the external circumference of the base member is guaranteed with this measure, which key clamp guarantees a safe clamping of the regulating member within the base member. The clamping element is for this purpose advantageously arranged on the side of the rack remote from the gear in the base member, while the keyway is arranged on the longitudinal side of the rack remote from the tooth system.

In order to enable with simple means an exact guiding of the regulating member in the base member, the regulating member is advantageously constructed as a cylindrical bolt guided axially in a cylindrical guideway in the base member, on one longitudinal side of which cylindrical bolt is arranged the rack tooth system and on the other side of which cylindrical bolt is arranged the recessed keyway. The path of adjustment of the regulating member within the base member can be easily defined by the keyway being closed at its ends forming a preferably key-shaped or pitch-cone-shaped stop for the clamping member.

A further particularity of the invention is that the axes of rotation of the gear and of the clamping screw are aligned essentially perpendicularly with respect to one another, with the clamping screw axis being arranged in the base member offset slightly with respect to the gear axis in direction of the tool, namely, at a distance less than the gear radius. Thus a reliable clamping with respect to the base member and not alone with respect to the gear is guaranteed in every position of the regulating member by tightening the clamping element.

A further improvement in this respect can be achieved by the rack being provided with a central bore and by the keyway having an opening in its bottom wall to the central bore of the regulating member. The regulating member can in this case, under the action of the clamping member pressed with its key or cone tip against the key flanks, be expanded at least locally and can be pressed with its cylindrical outer surface segments against the cylindrical guide surface of the base member. The clamping element extends advantageously with its key or cone tip through the opening of the keyway, which opening is in the bottom wall. The central bore is at the same time suited for entrance of a cooling medium from the shaft to the tool.

BRIEF DESCRIPTION OF THE DRAWINGS

The invention will be discussed in greater detail in connection with one exemplary embodiment schematically illustrated in the drawings, in which.

DETAILED DESCRIPTION

Figure 1:
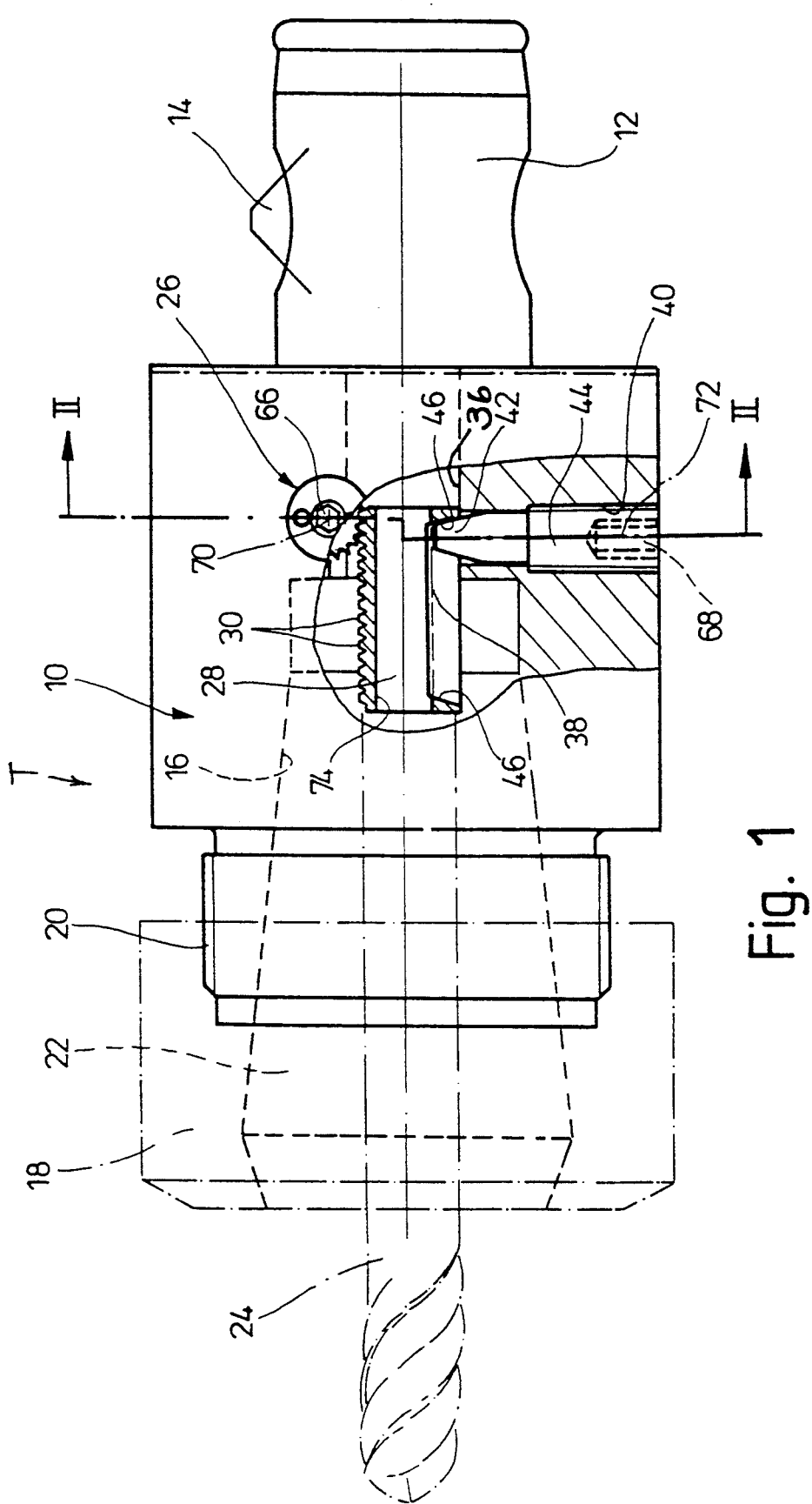
FIG. 1 is a partially sectioned side view of a tool holder having an externally operable regulating member.
Figure 2:
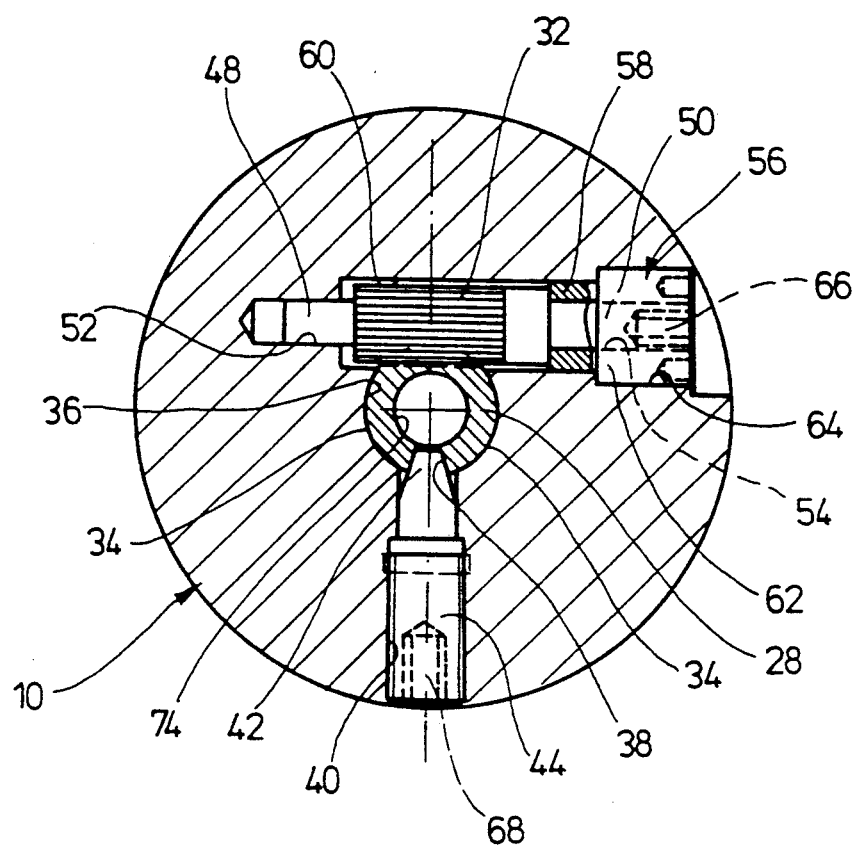
FIG. 2 is a cross-sectional view taken along the line II—II of FIG. 1.

The tool holder T illustrated in the drawings consists essentially of a base member 10, a rearwardly extending shaft constructed as a fitting pin 12 having a tensioning bolt mechanism 14 for facilitating a connection to a machine spindle (not illustrated) or a spindle adapter, a frontwardly opening recess 16 having an elongated collet device 22 extending thereinto and fixed to the base member 10 by a clamping nut 18 threadedly engaged to an external thread 20 on the base member 10, and a tool 24 and a regulating member 28 which serves as a positioning stop for the tool 24 and can be operated in an axial direction of the tool holder T by an externally accessible adjusting mechanism 26. The regulating member 28 is constructed as a rack, that is, it has a linear tooth system 30 on one of its longitudinally extending sides which mates with a roller-shaped gear 32 rotatably supported in the base member. The regulating member 28 is furthermore guided for axial movement by smooth cylindrical outer surface sections 34 thereon in a cylindrical guide bore 36 in the base member. The regulating member 28 has on a side thereof opposite the linear tooth system 30 an elongated keyway 38 which is aligned axially parallel with the direction of movement of the regulating member 28 and into which extends in a direction perpendicular to the direction of movement of the regulating member 28 a conical tip 44 of a clamping screw 42, which clamping screw is guided in an internally threaded hole 40 in the base member. The elongated keyway 38 is closed at its opposite ends by inclined or cone-like boundary stops 46 for the conical tip 44 of the clamping screw 42. The boundary stops 46 thus limit the path of movement of the regulating member 28 within the base member 10.

The roller-shaped gear 32 has two axially projecting bearing pins 48, 50, of which the bearing pin 48 is supported in a low friction bearing bore 52 in the base member while the other bearing pin 50 extends in a center bore 54 in a bearing sleeve 56. The bearing sleeve 56 has a cylindrical shoulder 58 which is received in a housing bore 60 for the gear 32 and is threadedly engaged with and locked against rotation by a threaded part 62 to an internal thread 64 in a bore in the base member 10. The gear 32 and the clamping screw 42 has hexagonally-shaped recesses 66, 68 externally accessible so that they can be adjusted with the aid of a tool, such as an appropriately shaped Allen wrench. A rotation of the gear 32 is thereby transformed into a linear movement of the regulating member 28. It is therefore possible to indicate the extent of the path of movement by a millimeter dial equally divided in peripheral direction on the circumference of the bearing sleeve 56.

FIG. 1 shows that the axes of rotation 70, 72 of the gear 32 and of the clamping screw 42, which axes of rotation are perpendicular with respect to one another, are arranged slightly offset in the direction of movement of the regulating member so that when the clamping screw 42 is tightened, a torque is applied to the elongated regulating member 28 which results in a clamping of the regulating member within the cylinder guide 36.

The regulating member 28 has a longitudinally extending bore 74 through which the tool 24 receives a cooling medium from the shaft. The keyway 38 has in the illustrated exemplary embodiment an opening in its bottom wall which communicates with the longitudinal bore 74 so that the bore 74 in the regulating member, under the clamping action of the conical tip 44 of the clamping screw 42, is locally spread apart to cause the outer cylindrical surface 34 to be pressed against the wall surface of the cylindrical guide bore 36 of the base member 10.

In conclusion the following can be stated: The invention relates to a tool holder having a base member 10, a shaft 12 arranged on the rearward end of the base member 10 for connection to a machine spindle and a recess 16 in the front end of the base member 12 which is arranged coaxially with respect to the axis of the shaft and is adapted to receive therein a coaxially aligned tool 24 which can be clamped in place by means of a clamping member 22. Furthermore, an elongated regulating member 28 is axially movably guided in the base member 10 and serves as the positioning stop for the tool 24. In order to make possible a simple adjustment of the regulating member from a location external to the tool holder, the regulating member 28 is constructed so that it has an axially extending rack thereon, while a gear 32 mating with the tooth system 30 of the rack and a clamping screw 42 engaging the keyway 38 of the regulating member 28 with its cone tip 44 are supported in the base member 10.

The embodiments of the invention in which an exclusive property or privilege is claimed are defined as follows:

1. In a tool holder having a base member, a shaft which is arranged on the rearward end of the base member for connection to a machine spindle or a spindle adapter, a recess at a front end of the base member and is arranged coaxially with respect to the shaft axis for receiving therein a coaxially aligned tool which can be clamped in place by means of a clamping member and a regulating member axially movable in the base member and engaged by a clamping element from a side of the shaft into a recess, to form a positioning stop for the tool, with the regulating member being constructed so that it has an axially extending rack thereon and a gear mating with the tooth system of the rack and a clamping element supported in the base member movable into and out of engagement with the rack, the improvement wherein the regulating member has an axially extending keyway for receiving and guiding therein a corresponding key or cone tip on the clamping element, and wherein the regulating member, under the action of the clamping element pressing with its key or cone tip against the flanks of the keyway, can at least locally be expanded and thereby pressed against the base member.

2. The tool holder according to claim 1, wherein two oppositely extending bearing pins are formed on the gear, of which one pin extends into a low friction bearing bore in the base member and the other pin extends into a bearing sleeve inserted from outside into the base member.

3. The tool holder according to claim 2, wherein the bearing sleeve has a through bearing bore receiving therein the respective bearing pin, and wherein the bearing pin has an externally accessible, polygonal recess for engagement by an adjusting tool.

4. The tool holder according to claim 1, wherein the clamping element is constructed as a clamping screw adjustable perpendicularly with respect to the direction of movement of the regulating member in the base member, and engaging with a cone tip the keyway of the regulating member.

5. The tool holder according to claim 1, wherein the clamping element is arranged in the base member on a side of the regulating member remote from the gear.

6. The tool holder according to claim 1, wherein the keyway is arranged on a longitudinal side of the regulating member remote from the rack tooth system.

7. The tool holder according to claim 1, wherein the regulating member is guided for axial movement in a cylindrical guide bore in the base member by means of cylindrical outer segments thereof which lie opposite to one another and are arranged outside of the tooth system and the keyway.

8. The tool holder according to claim 1, wherein the keyway is closed at each of its ends to form a key-shaped or pitch-cone-shaped boundary stop for the clamping element.

9. The tool holder according to claim 4, wherein the axes of rotation of the gear and of the clamping screw are aligned essentially perpendicularly to one another.

10. The tool holder according to claim 9, wherein the axis of rotation of the clamping screw is arranged in the base member offset with respect to the axis of rotation of the gear in direction of the tool recess a distance at less than the gear radius.

11. The tool holder according to claim 1, wherein the regulating member has an axially extending central bore.

12. The tool holder according to claim 11, wherein the keyway has an opening in its bottom wall opening toward the axis central bore of the regulating member.

13. The tool holder according to claim 12, wherein the regulating member, under the action of the clamping element, which presses with its key or cone tip against the key flanks, can be expanded at east locally to press cylindrical outer segments of said regulating member force-lockingly against the wall surface of the cylindrical guide bore of the base member.

14. The tool holder according to claim 12, wherein the clamping element extends with its key or cone tip through the opening on the bottom side of the keyway.

* * * * *